United States Patent Office 3,299,130
Patented Jan. 17, 1967

3,299,130
PRODUCTION OF SUBSTITUTED THIOUREAS
Reginald Trevor Wragg, Bolehall, Tamworth, England, and Charles Edwin Kendall, Downer, Canberra, Australia, assignors to Dunlop Rubber Company Limited, London, England, a British company
No Drawing. Filed Aug. 24, 1964, Ser. No. 391,729
Claims priority, application Great Britain, Aug. 29, 1963, 34,141/63
11 Claims. (Cl. 260—552)

This invention relates to the production of substituted thioureas comprising the thioureas of the general formula RHN.CS.NRH where R represents an alkyl, cycloalkyl or aromatic radical (hereinafter called "the group specified").

According to the present invention, a method for the manufacture of a compound of the group specified comprises reacting carbon tetrachloride with a primary amine having the general formula $RNH_2$ in which R is the same as R in the desired product in the presence of hydrogen sulphide under a pressure greater than atmospheric pressure.

The method of the present invention favours the production of the thiourea derivative as opposed to the dithiocarbamic acid derivative especially when the pressure under which the reaction is carried out is from 100 to 200 pounds per square inch. Preferably, the reaction mixture also contains an inorganic base or strong organic tertiary base to act as an acid acceptor and this permits a smaller amount of the amine to be employed.

Typical inorganic bases that can be employed are the oxides of metals such as magnesium zinc and calcium. Carbonates and bicarbonates are not preferred since the carbon dioxide liberated reacts with the amine in competition with the hydrogen sulphide. The use of the oxide as a slurry in water is desirable. A typical strong tertiary organic base, used particularly for the reaction of aromatic amine, is triethylamine.

The reaction is exothermic and a rapid rise in temperature of the reaction mixture accompanies the mixing of the ingredients. As a result, the pressure of the hydrogen sulphide atmosphere above the liquid mixture increases and it is necessary to carry out the reaction within a pressure vessel such as an autoclave. The reaction mixture is preferably stirred during the reaction since the mixture may be paste-like.

The method gives rise to a substituted thiourea in almost the theoretical yield. The amine that is employed depends on the particular thiourea derivative required, but examples of suitable amines are ethylamine, propylamine, isopropylamine, butylamine and any other primary amine.

The invention is illustrated in the following examples:

Example I

This example illustrates the preparation of dibutyl thiourea, in which the use of an autoclave is shown to be advantageous.

Normal butyl amine and carbon tetrachloride were placed in a molar ratio of 6:1 in an autoclave and hydrogen sulphide gas passed into the autoclave until the pressure was 150–200 pounds per square inch. A rapid reaction took place accompanied by a large evolution of heat and the reaction was complete in 10–15 minutes. The pressure was released and the reaction mixture washed with water to remove any amine hydrochloride and the remaining dibutyl thiourea was purified by recrystallization from a benzene/petrol mixture. The dibutyl thiourea was obtained in almost theoretical yield based on the amount of the carbon tetrachloride.

Example II

This example illustrates the preparation of dibutyl thiourea in which triethylamine is added to the reaction mixture.

The procedure outlined in Example I was repeated, except that 2 gramme moles of n-butylamine were used, and 4 gramme moles of triethylamine were added to the reaction mixture. The product, which was identified as dibutyl thiourea, was isolated as in Example I. The yield of dibutyl thioureas was quantitative based on the amount of the carbon tetrachloride. The triethylamine was recovered from the amine hydrochloride formed, by addition of a base followed by distillation.

Having now described our invention, what is claimed is:

1. A method for the manufacture of a thiourea of the general formula RHN.CS.NRH where R represents an alkyl, cycloalkyl or aromatic radical comprising reacting carbon tetrachloride with a primary amine having the general formula $RNH_2$, in which R is the same as R in the desired product, in the presence of hydrogen sulphide, under a pressure greater than atmospheric pressure, the amount of primary amine being at least sufficient to react with all the carbon tetrachloride.
2. A method according to claim 1 in which the pressure is up to 200 lbs. per square inch.
3. A method according to claim 2 in which the pressure is from 100 to 200 lbs. per square inch.
4. A method according to claim 1 in which the reaction mixture contains an inorganic base.
5. A method according to claim 1 in which the reaction mixture contains a strong organic tertiary base.
6. A method according to claim 1 in which the reaction is effected in an autoclave.
7. A method according to claim 4 in which the inorganic base is magnesium oxide.
8. A method according to claim 4 in which the inorganic base is zinc oxide.
9. A method according to claim 4 in which the inorganic base is calcium oxide.
10. A method according to claim 4 in which the inorganic base is used as a slurry in water.
11. A method according to claim 5 in which the organic base is triethylamine.

No references cited.

ALEX MAZEL, *Primary Examiner.*
HENRY R. JILES, *Examiner.*